United States Patent [19]

Krishnan et al.

[11] Patent Number: 4,922,416
[45] Date of Patent: May 1, 1990

[54] INTERFACE DEVICE WITH END MESSAGE STORING REGISTER AND INTERRUPT SERVICE REGISTERS FOR DIRECTING SEGMENTED MESSAGE TRANSFER BETWEEN INTELLIGENT SWITCH AND MICROCOMPUTER

[75] Inventors: Iyengar N. Krishnan, Milford; Herbert J. Toegel, Middlebury, both of Conn.

[73] Assignee: Alcatel USA, Corp., New York, N.Y.

[21] Appl. No.: 682,034

[22] Filed: Dec. 14, 1984

[51] Int. Cl.[5] .................. G06F 13/00; G06F 13/28; G06F 13/14

[52] U.S. Cl. .................. 364/200; 364/238.2; 364/242.3; 364/251.1; 364/238.5; 364/241.9; 364/251.3; 364/246.3; 364/247.8

[58] Field of Search ... 364/200 MS File, 900 MS File; 370/58

[56] References Cited

U.S. PATENT DOCUMENTS

| | | | |
|---|---|---|---|
| 4,004,277 | 1/1977 | Gavril | 364/200 |
| 4,247,893 | 1/1981 | Anderson | 364/200 |
| 4,355,388 | 10/1982 | Deal, Jr. | 370/80 |
| 4,387,433 | 6/1983 | Cardenia | 364/200 |
| 4,400,772 | 8/1983 | Broyles | 364/200 |
| 4,403,282 | 9/1983 | Holberger et al. | 364/200 |
| 4,491,916 | 1/1985 | Vailhonrat | 364/200 |
| 4,493,051 | 1/1985 | Brezzo | 364/900 |
| 4,549,263 | 10/1985 | Calder | 364/200 |
| 4,570,218 | 2/1986 | Debesson | 364/200 |
| 4,570,258 | 2/1986 | McCraken | 370/58 |
| 4,600,991 | 7/1986 | Schonberger et al. | 364/200 |
| 4,654,654 | 3/1987 | Butler | 370/85 |
| 4,704,606 | 11/1987 | Hasley | 370/82 |

FOREIGN PATENT DOCUMENTS 0060388 9/1982 European Pat. Off. .
8301135 3/1983 World Int. Prop. O. .

OTHER PUBLICATIONS

Electronics International, vol. 55, No. 20, Oct. 6, 1982, pp. 101–103.
Electronics International, vol. 56, No. 16, Aug. 11, 1983, pp. 121–125.

Primary Examiner—David Y. Eng
Assistant Examiner—Emily Y. Chan
Attorney, Agent, or Firm—Peter Van Der Sluys

[57] ABSTRACT

An interface for effecting the direct transfer of message segments between an intelligent switch and a microcomputer includes an input buffer, an output buffer and a memory for storing address to be associated with the message segments traversing the buffers.

4 Claims, 3 Drawing Sheets

4,922,416

INTERFACE DEVICE WITH END MESSAGE STORING REGISTER AND INTERRUPT SERVICE REGISTERS FOR DIRECTING SEGMENTED MESSAGE TRANSFER BETWEEN INTELLIGENT SWITCH AND MICROCOMPUTER

CROSS-REFERENCE TO RELATED APPLICATIONS

This application is related to the following U.S. patent applications: Ser. No. 682,030; Ser. No. 682,033; Ser. No. 682,035; Ser. No. 682,228; Ser. No. 682,038 all filed on even date herewith; and Ser. No. 722,894 filed on Apr. 12, 1985. All of the above applications are assigned to the assignee hereof.

BACKGROUND OF THE INVENTION

The present invention generally relates to an interface for direct data transfers and, in particular, relates to such an interface for effecting direct data transfers between an intelligent switch and a microcomputer.

The direct data transfer from the random-access-memory (RAM) of one microcomputer to the RAM of another microcomputer is known. Characteristically, such transfers are effected by means of known handshake signal techniques. Basically, the initiating microcomputer accesses the other to request control of the other microcomputers local bus. When the accessed microcomputer yields control of its local bus, the initiating microcomputer, now controlling the local buses of both devices proceeds to read or write to the accessed RAM and, when the data transfer is complete, signals the completion of the transfer. The accessed device then regains control of its local bus.

Usually, such data transfers are executed to effect the transfer of large amounts of data. The direct data transfer, also referred to as "direct memory access" (DMA) results in a substantial savings of computing time compared to, for example, a first-in-first-out data transfer.

However, also characteristically, the accessed microcomputer, after relinquishing its local bus, can only service the accessing microcomputer. For example, if a read is being performed on the accessed device, the accessed device must wait until the completion of that process before executing a read or write itself or participating in a data transfer with another device. It is for this reason that DMA transfers are conventionally restricted to large data transfers.

Further, when accessed, a device provides one address to the accessing device. This address represents a single starting address which the accessing device uses as a starting address from which it will read or to which it will write. That is, only a single starting address is generated by an accessed device for the transfer of substantial blocks of data. Hence, the transfer of a complete block of data must be completed before another starting address is supplied, i.e., before the device can be accessed again.

Still another characteristic of conventional DMA transfers is the requirement that the RAM of the accessing microcomputer must be linked, literally, directly, i.e., without intermediate storage devices, to the RAM of the accessed device. But for this characteristic, the use of DMA transfers would become disadvantageous due to the added read/write steps necessary to carry data through any storage medium.

These characteristics, however, place severe constraints on many potential implementations of such a technique. Hence, the direct transfer of data between a microcomputer and devices such as, for example, an intelligent switch, has, heretofore, been impractical.

SUMMARY OF THE INVENTION

Accordingly, it is one object of the present invention to provide an interface for effecting direct data transfers between an intelligent switch and a microcomputer.

This object is accomplished, at least in part, by an interface having input and output buffers adapted to read and write, respectively, message segments to and from, respectively, an intelligent switch.

Other objects and advantages will become apparent to those skilled in the art from the following detailed description read in conjunction with the appended claims and the drawings attached hereto.

DETAILED DESCRIPTION OF THE INVENTION

Figure 1:
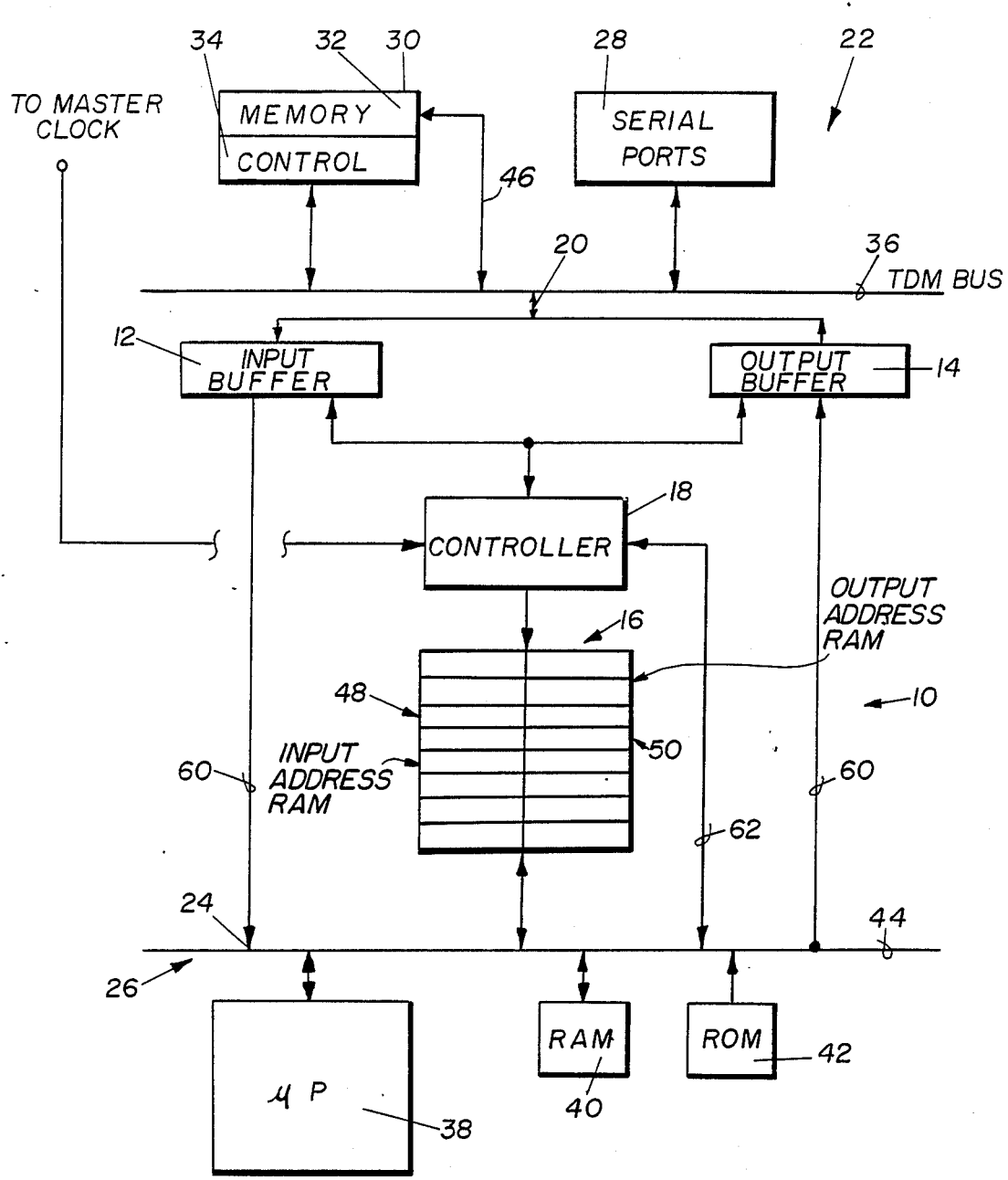
FIG. 1 is a block diagram of an interface embodying the principles of the present invention.

An interface, generally indicated at 10 in FIG. 1 and embodying the principles of the present invention, includes an input buffer 12, an output buffer 14, an address storage medium 16 and an interface controller 18.

The interface 10 is shown interconnected, at a first port 20 thereof, to an apparatus 22 for establishing communication paths and, at a second port 24 thereof, to a microcomputer 26. The apparatus 22 includes a plurality of serial ports 28, and an intelligent switch 30 having a memory 32 and a switch controller 34. The ports 28 and the switch 30 are interconnected via a time-division-multiplexed (TDM) bus. One such apparatus 22 is described and discussed in U.S. patent application Ser. No. 682,228 entitled "Apparatus for Establishing Communication Paths" filed on even date herewith and assigned to the assignee hereof, now U.S. Pat. No. 4,639,910. The above referenced patent application is deemed fully incorporated herein by reference. As fully discussed therein, in one particular scheme the transport of information along the TDM bus 36 is organized by frames. Each frame is subdivided into thirty-two channels each of which is further subdivided into sixteen words. Hence, there are 512 words per frame, each word, preferably, being represented by 16 bits of information. The movement of information via a TDM bus is known and need not be discussed in detail other than to point out that such an apparatus 22 includes a master clock, not shown in the drawings, that provides strobe signals to the various destinations to indicate the arrival of the appropriate time slot carrying information therefor.

As used herein the phrase "intelligent switch", or the idiomatic equivalents, thereof is taken to mean a device adapted to dynamically assign, or switch, a plurality of communication paths. One particular embodiment of an intelligent switch 30 includes a scratch pad memory 32 of the type described and discussed in U.S. patent application Ser. No. 628,033 entitled "Apparatus and Method for Providing Dynamically Assigned Switch Paths" filed on even date herewith and assigned to the assignee hereof, now U.S. Pat. No. 4,656,626. In addition, the intelligent switch 30 includes a means for controlling, shown herein as controller 34, the path assignments in the scratch pad memory 32. One switch controller 34 particularly adapted to operate with the scratch pad memory 32 shown in the immediately above mentioned patent application is fully described in U.S. patent application Ser. No. 682,030 entitled "Switch Controller," filed on even date herewith and assigned to the assignee hereof. The two above-mentioned patent applications are deemed incorporated herein by reference.

The microcomputer 26, in one preferred embodiment, includes a microprocessor portion 38, a random access memory 40 (RAM) and a read only memory 42 (ROM) interconnected via a local bus 44. The microcomputer 26 is of the type provided with the commonly known handshake signals necessary for control over the local bus 44 whereby the RAM 40 can be directly accessed by an external intelligent device. Although other compatible microcomputers can be used, one particularly appropriate microcomputer is the 8086 manufactured and marketed by the INTEL Corporation of Santa Clara, Calif.

In the preferred embodiment, the input and output buffers, 12 and 14, respectively, are sixteen bit latching registers. Thus, in response to the strobe from the controller 18, a sixteen bit word is read from, or written onto, a designated word slot of the TDM bus 36. The designation of time slots is effectively controlled by the apparatus 22 and, in this embodiment, includes a memory interconnection bus 46 whereby data is read from, or written into, the data portion of the memory 32. With reference to the above-identified application Ser. No. 682,033 entitled "Apparatus and Method For Providing Dynamically Assigned Path" now U.S. Pat. No. 4,656,626 the data portion is the RAM of the CAM/RAM/CAM array.

The address storage medium 16 is, preferably a 256 bit random access memory (RAM). This RAM 16 is effectively arranged as an input address storage RAM 48 and an output address storage RAM 50. In the most powerful embodiment of the interface 10, the input address storage RAM 48 can contain eight different 16 bit addresses, each pointing to a different location in the RAM 40 of the microprocessor 38. Each such address can be dedicated to a different word slot on the TDM bus 36. Further, each of the eight addresses is incremented via the controller 18 after each message segment associated with a particular word slot is transferred from the input buffer 12 to the RAM 40. Hence, the interface 10 can receive message segments from eight different word slots of the TDM bus 36. Similarly, the output address storage RAM 50 can contain eight different 16 bit addresses, each pointing to a unique location in the RAM 40 of the microprocessor 38. Each such address is assigned, or dedicated, to a different word slot on the TDM bus 36. These output addresses are incremented via the controller 18 after each output message segment associated with a particular word slot is transferred across the interface 10. Thus, the interface 10 can, effectively, simultaneously handle eight incoming messages and eight outgoing messages. The particular starting addresses for each different word slot are provided by the microprocessor 38.

Figure 2:
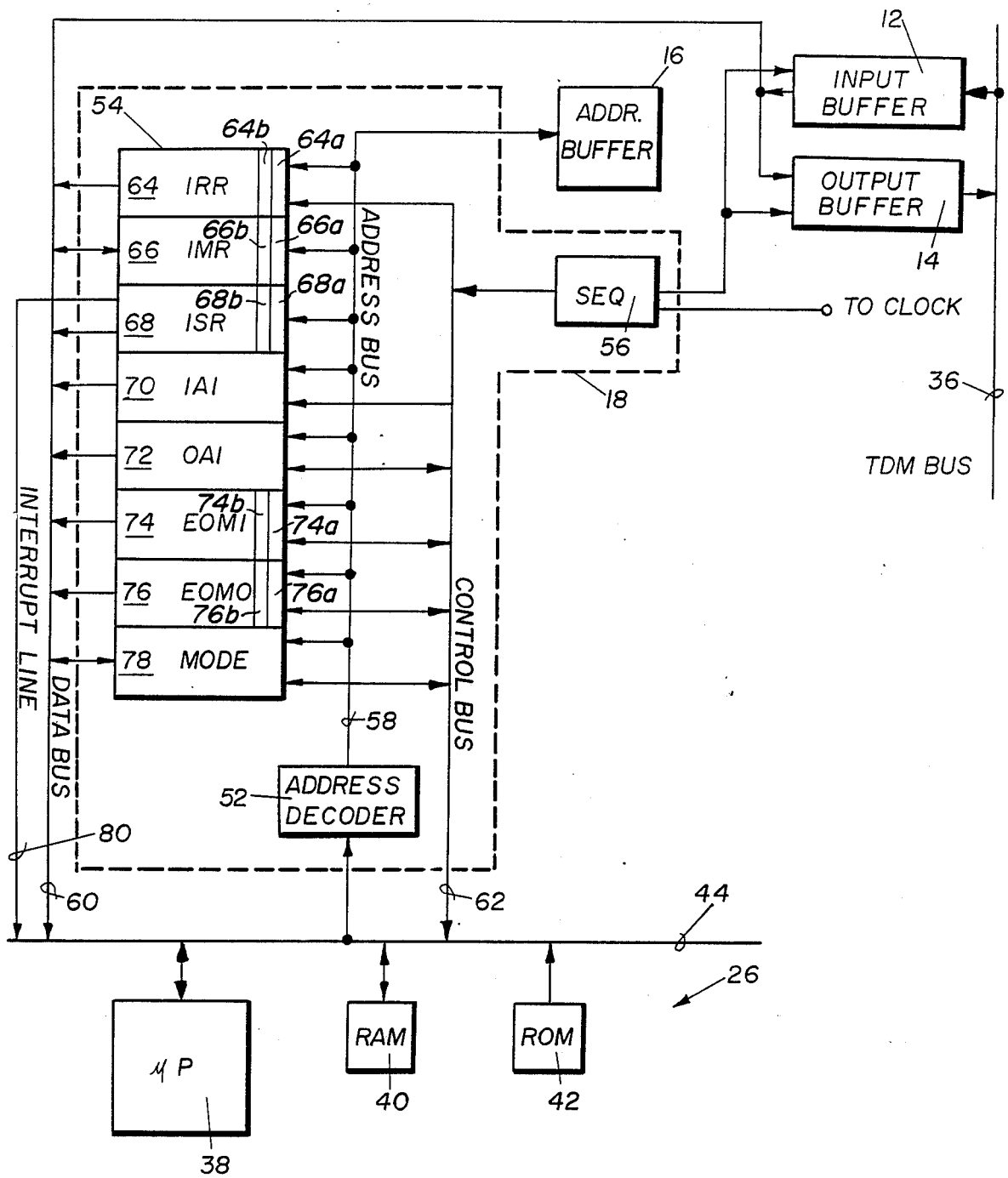
FIG. 2 is a block diagram of an interface controller embodying the principles of the present invention.

One embodiment of the interface controller 18 particularly adapted to effect the orderly direct data transfer between the RAM of the memory 32 and the RAM 40 of the microprocessor 26, via the TDM bus 36 and either one of the buffers, 12 or 14, is shown in FIG. 2.

As shown therein the interface controller 18 includes an address decoder 52, a plurality of registers 54 and a sequencer 56. The address decoder 52 is, preferably, memory mapped to allow direct access to the registers 54 and the address storage RAMs, 48 and 50, by the microprocessor 38. As shown the address decoder 52 interconnects to each of the registers 54 and RAMs, 48 and 50, via address bus 58 and is accessed by the microprocessor 38 by the local bus 44 thereof. By memory mapped it is meant that the microprocessor 38, via the ROM 42 thereof, and, in response to a strobe from the sequencer 56, retrieves an address from the ROM 42 and presents that address on the pins directly connecting to the address decoder 52. The address decoder 52 then latches the addressed destination to the microprocessor 38 whereafter the microprocesser 38 executes a read or write to that latched destination via data bus 60 thereof. As known, the address and data buses, 58 and 60, have the signals multiplexed thereon on the local bus 44 of the microcomputer 26. Hence, as more fully discussed below in conjunction with the state diagram shown in FIG. 3, any read or write operation of the interface 10 can be shown as four different steps. Each step being responsive to a strobe signal from the sequencer 56 to the microcomputer 26 via a control bus 62.

In the following discussion of the various registers 54 it is understood that the phrases "set" refers to any change in the logic level of a bit in a register in response to an event. The phrase "reset" refers to the return to the previous logic level of a particular bit that has been changed in response to an event, i.e., that bits starting logic level before any events. It is immaterial whether the original, or starting, logic level is a binary one or a binary zero. Further, reference to binary ones or zeros does not imply any particular voltage or current and a set or reset implies only a change thereof.

The registers 54 include interrupt registers, 64, 66 and 68, intermediate message address incrementers, 70 and 72, end of message registers, 74 and 76, and a mode register 78. The interrupt registers can be designated as an interrupt request register (IRR) 64, an interrupt mask register (IMR) 66 and an interrupt service register (ISR) 68. The intermediate message address incrementers can be designated as an input address incrementer (IAI) 70 and an output address incrementer (OAI) 72. The end of message registers are designated as an end of message on input (EOMI) 74 and an end of message on output (EOMO) 76.

In the preferred embodiment the IRR 64 is an eight bit register that can only be read by the microprocessor 38 and includes, inter alia, bits 64a and 64b that are set when any end of message signal is recorded in the EOMI bits of 74 such as bits 74a and 74b or the bits of EOMO 76 such as bits 76a and 76b. These bits are reset when the EOMI 74 or EOMO 76 are reset. Hence, as more fully discussed below with regard to the EOM registers, 74 and 76, the microprocessor 38 can be interrupted in response to the inputting or outputting of a complete message. In addition to these bits the remaining bits in the IRR 64 can be set to alert the microcomputer 26 to other system conditions such as alarms, errors or the like.

The IMR 66 is an eight bit register, having bits 66a and 66b and can be read from or written to, by the microcomputer 26. When a bit is set therein the setting of a corresponding bit in the IRR 64 is prevented from causing an interrupt signal to be sent to the microprocessor 26. Thus, under conditions where the microcomputer 26 is performing a program that, for example, has priority, the prioritizing can be accomplished by setting the lower priority task bits in the IMR 66 to ensure that a lower priority task will not interrupt with the presently executing program.

The ISR 68 is a read only eight bit register and, when a bit therein is set, generates an interrupt signal via an interrupt line 80 to the local bus 44 of the microcomputer 26. The bits in the ISR 68 such as bits 68a and 68b will be set in response to a logical AND of the corresponding bits 64a and 64b in the IRR 64 with the inverse of the corresponding bits 66a and 66b in the IMR 66.

The IAI 70 is an eight bit read only register that is incremented each time a message segment is written from the input buffer 12 into the RAM 40. Hence, in the embodiment wherein eight input starting addresses are provided to the input address storage RAM 48, the address in the IAI 70 represents the next address into which the next message segment of a particular word slot is to be stored. This address, after being incremented is returned to the input address storage RAM 48 to be used for the next message segment from the same word slot.

Similarly, the OAI 72 is an eight bit read only register that tracks the addresses in the output address storage RAM 48. Hence, the OAI 72 provides for the continous updating of the address of the next particular message segment associated with a particular word slot or the TDM bus 36 to which a message stored in the RAM 40 is being sent.

The EOMI 74 is an eight bit read only register. Each bit therein is associated with a particular word slot on the TDM bus 36 that is being serviced. When an end-of-message flag enters the input buffer 12 the sequencer 56 sets the bit in the EOMI 74 corresponding to the word slot from which the flag arrived. The corresponding bit in the IRR 64 is set and no further message segments will be received by the input buffer 12 from that word slot. The IRR 64 bit and the EOMI 74 bit are reset in response to the provision, by the microprocessor 38, of a new input starting address to the input address storage RAM 48 for that address slot therein.

Similarly, the EOMO 76 is an eight bit read only register having each bit therein associated with a particular word slot on the TDM bus 36. The bits, and the corresponding bits in the IRR 64 are set and reset as described above with respect to the EOMI 74. However, of course, the reset occurs in response to the provision of a new address being written into the output address storage RAM 50.

The mode register 78 is provided to allow the present interface 10 to be used in conjunction with another interface, such as, for example, a first-in-first-out buffer interface. A bit in the mode register 78 is then set or reset according to the desired mode of operation. One such bimodal interface is described and discussed in U.S. patent application Ser. No. 682,035 entitled "Adaptive Interface for use with a Microcomputer" filled on even date herewith and assigned to the assignee hereof. This application is deemed incorporated here by reference.

The sequencer 56 is, for all intents and purposes, a state machine. As well known, a state machine is a controller the next state of which depends only on its present state and its present inputs. Such state machines can be implemented by use of readily available programmable logic arrays (PLAs) or by programmable read only memories (PROMs). Preferably, however, the interface 10 is implemented busing large scale integration (LSI) techniques and satisfies the state diagram shown in FIG. 3. In the preferred embodiment, the transition between states occurs upon receipt of a clock signal from an external clock, not shown in the drawings. Usually, the clock signal is provided by a master clock whereby the state transitions are coordinated with that system.

Figure 3:
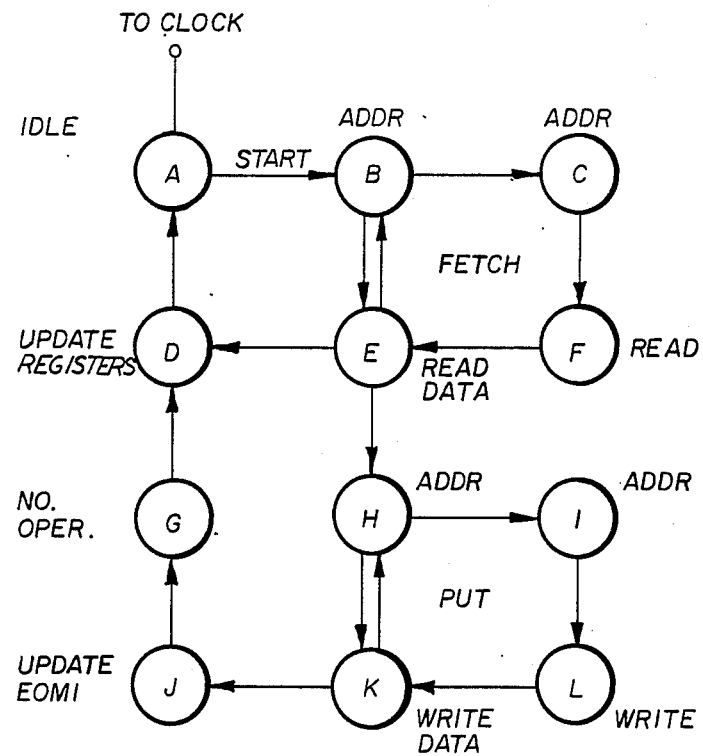
FIG. 3 is a state diagram depicting the direct data transfer across the interface.

Referring to FIG. 3 the essential states of the sequencer 56 are shown and lettered A through L. State 'A' is an idle state which signifies that the interface is ready to interact with the TDM bus 36. When strobed the sequencer 56 moves to state 'B' whereupon the address of the next message segment of a predetermined word slot is acquired by the microprocessor 38. At state "C" the address is secured by the microprocessor 38 which message segment is, at state 'F', directly transferred from the RAM 40 to the output buffer 14. At state 'E' the message segment in the output buffer 14 is injected, or read into, the appropriate word slot on the TDM bus 36.

On the next strobe, if there is no incoming message segment, the registers 54, for example the OAI 72 and EOMO 76 if the message segment outputted was the end of a message, are updated, during state 'D'. If, however, a message segment is arriving in the next designated word slot the state machine shifts to state 'H'. In state 'H' the microprocessor 38 acquires the address associated with the word slot having an incoming message segment and, in state 'I' presents that address to the RAM 40.

During states 'L' and 'K' the message segment is written into the input buffer 12 and then, at 'K', directly written into the RAM 40. The next state, state 'J', is used to update the registers 54. The following transition, to state 'G', is, effectively, a 'no operation' state but is used to maintain the state machine in sequence with the clock pulse.

As shown, when at either state 'E' during a "fetch" or state 'K' during a "put" the sequencer 54 is able to attain states 'B' or 'H' respectively. Such state transitions can be implemented to allow the interface 10, having a 16 bit microcomputer 26, to be readily used with an eight bit system. In such an eight bit system it would thus be desirable to read or write two eight bit words to maximize the efficiency of the microcomputer 26.

The interface 10, as described herein, thus provides the use of direct data transfers, and attains all the benefits resulting therefrom, without the characteristic drawbacks.

The present invention has been described herein with regard to a particular exemplary embodiment and is not deemed limited thereto as other configurations and uses may be developed which, nevertheless, do not depart from the spirit and scope of this invention. Consequently, the present invention is deemed limited only by the appended claims and the reasonable interpretation thereof.

What is claimed is:

1. An interface for effecting direct data transfer between an intelligent switch and a storage medium of a microcomputer, said microcomputer having a local bus connected to said storage medium and a microprocessor, said interface comprising:

an input buffer for accepting data from said intelligent switch, said nput buffer transferring data to said local bus via a data bus;

an output buffer for presenting data to said intelligent switch, said output buffer receiving data from said local bus via said data bus, said data is a segmented message and said input and output buffers are sized to accept one complete message segment each, the last segment of said segmented message including an end of message signal;

means for storing an address, said address being provided by said microprocessor and pointing to a location in said storage medium of said microprocessor, said address storing means being connected to said local bus via an address bus, whereby direct data transfer over said data bus between said addressed location in said storage medium and either one of said data accepting means or said data presenting means is performed by said microprocessor latching to said address and executing a read or write;

means, connected to said data bus and responsive to an end of message signal from one of said intelligent switch and said microcomputer, for registering an end of said segmented message, so that the microcomputer can detect when a message is complete by reading the register means, said end of message registering means including separate means for registering the end of a message from said intelligent switch, and means for registering the end of a message to said intelligent switch;

first means, responsive to said means for registering the end of a message from said intelligent switch, for requesting an interrupt signal to said microcomputer;

second means, reponsive to said means for registering the end of a messaged to said intelligent switch, or requesting an interrupt signal to said microcomputer, said first and second means being separate bits in an interrupt request register, said interrupt request register being connected to said means for registering the end of a message from said intelligent switch, and said means for registering the end of a message to said intelligent switch;

an interrupt mask register connected to said microcomputer and having bit positions set by said microcomputer; and an interrupt service register connected to said interrupt request register and said interrupt mask register for receiving bits therefrom, said interrupt service register having bit positions, said bit positions being set as a logical AND of the setting of corresponding bits in said interrupt request register, and the inverse of the setting of corresponding bits in said interrupt mask register, said interrupt service register providing an inerrupt signal in response to the settings of the bit positions, whereby said microcomputer can selectively prevent an interrupt signal by setting bit positions in said interrupt mask register.

2. An interface for effecting direct data transfer between an intelligent switch and a storage medium of a microcomputer, said microcomputer having a local bus connected to said storage medium and a microprocessor, said interface comprising:

means for accepting data from said intelligent switch, said data accepting means transferring data to said local bus via a data bus;

means for presenting data to said intelligent switch, said data presenting means receiving data from said local bus via said data bus, said data is a segmented message, and said accepting and said presenting means are sized to accept one message segment each, the last segment of said segmented message includes an end of message signal;

means, connected to said data bus and responsive to an end of message signal from one of said intelligent switch and said microcomputer, for registering an end of said segmented message, so that the microcomputer can detect when a message is complete by reading the register means, said end of message registering means includes a first register means having a plurality of bits, each of said bits corresponding to a different message from said intelligent switch, said first register means being responsive to an end of message signal contained in a message from said intelligent switch to set the bit corresponding to said message, and a second register means having a plurality of bits, each of said bits corresponding to a different message to said intelligent switch, said second register means being responsive to an end of message signal contained in a message to said intelligent switch to set the bit corresponding to to said message;

means for storing an address, said address being provided by said microprocessor and pointing to a location in said storage medium of said microcomputer, said address storing means being connected to said local bus via an address bus, whereby the direct data transfer over said data bus between said addressed location in said storage medium and either one of said data accepting means or said data presenting means is performed by said microprocessor latching to said address, and executing a read or write, said address storing means for storing a plurality of addresses, said plurality of addresses including a first group of addresses for data from said intelligent switch and a second group of addresses for data to said intelligent switch, each one of said first group of addresses points to a location in the said storage medium for storing a different message from said intelligent switch and each one of each of said second group of addresses points to a location in said storage medium for providing a different message to said intelligent switch.

3. Interface as claimed in claim 1 further comprising:
means, responsive to the setting of bits in said first or said second register, for requesting an interrupt signal to be sent to said microcomputer.

4. Interface as claimed in claim 3 further comprising:
means, connected to said interrupt request means and responsive to a request for an interrupt signal, for selectively providing an interrupt signal to the local bus.

* * * * *